Dec. 10, 1929.　　E. BACHELET　　1,738,981
MECHANICAL MOVEMENT
Filed Dec. 13, 1927　　2 Sheets-Sheet 1

INVENTOR.
Emile Bachelet.
BY John J. Thompson
ATTORNEYS.

Dec. 10, 1929.  E. BACHELET  1,738,981
MECHANICAL MOVEMENT
Filed Dec. 13, 1927  2 Sheets-Sheet 2
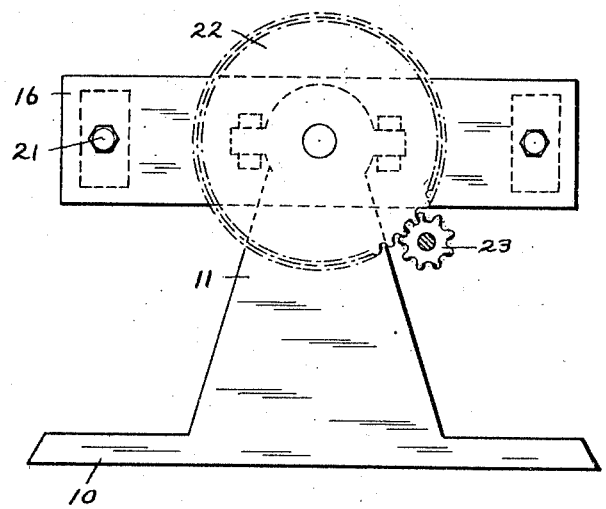
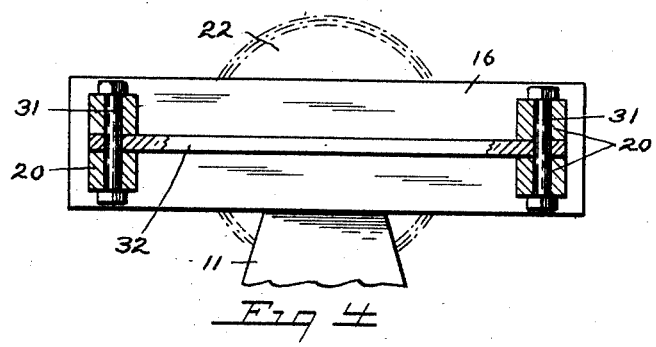
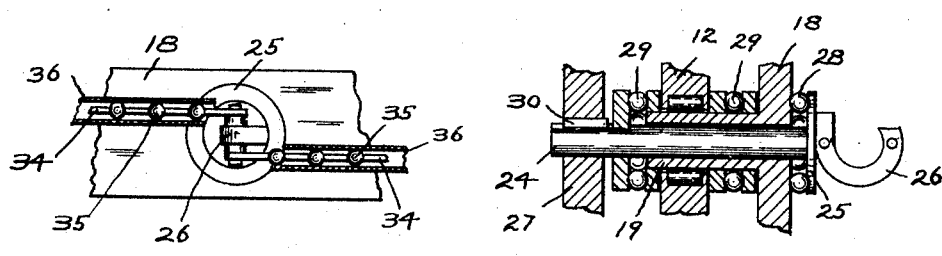
INVENTOR.
Emile Bachelet
BY John J Thompson
ATTORNEYS.

Patented Dec. 10, 1929

1,738,981

UNITED STATES PATENT OFFICE

EMILE BACHELET, OF POUGHKEEPSIE, NEW YORK

MECHANICAL MOVEMENT

Application filed December 13, 1927. Serial No. 239,625.

This invention relates to a novel form of mechanical movement, that may be incorporated into various machines where a device of this kind may be used to advantage, in the transmission of power, or for any suitable purpose.

The object of the invention is to provide a simple, durable and efficient construction and combination of parts, so arranged that movement or power applied to one end of the device, will be delivered from the other end in a novel manner.

With these and other objects in view, the invention consists in certain novel construction and combination of parts that will hereinafter be fully described and claimed, and illustrated in the accompanying drawings, which form a part thereof and in which like figures of reference refer to corresponding parts in all of the views, but it is to be fully understood that I do not confine myself to the exact design as shown as slight changes may be made without departing from the spirit of the invention.

In the drawings:—

Figure 3 shows an end view.

Figure 4 shows a cross section, taken on the line A—A of Figure 1.

Figure 5 shows a detail section taken on the line B—B of Figure 1.

Figure 6 shows a detail sectional view of the shaft mounting.

Figures 1, 2:
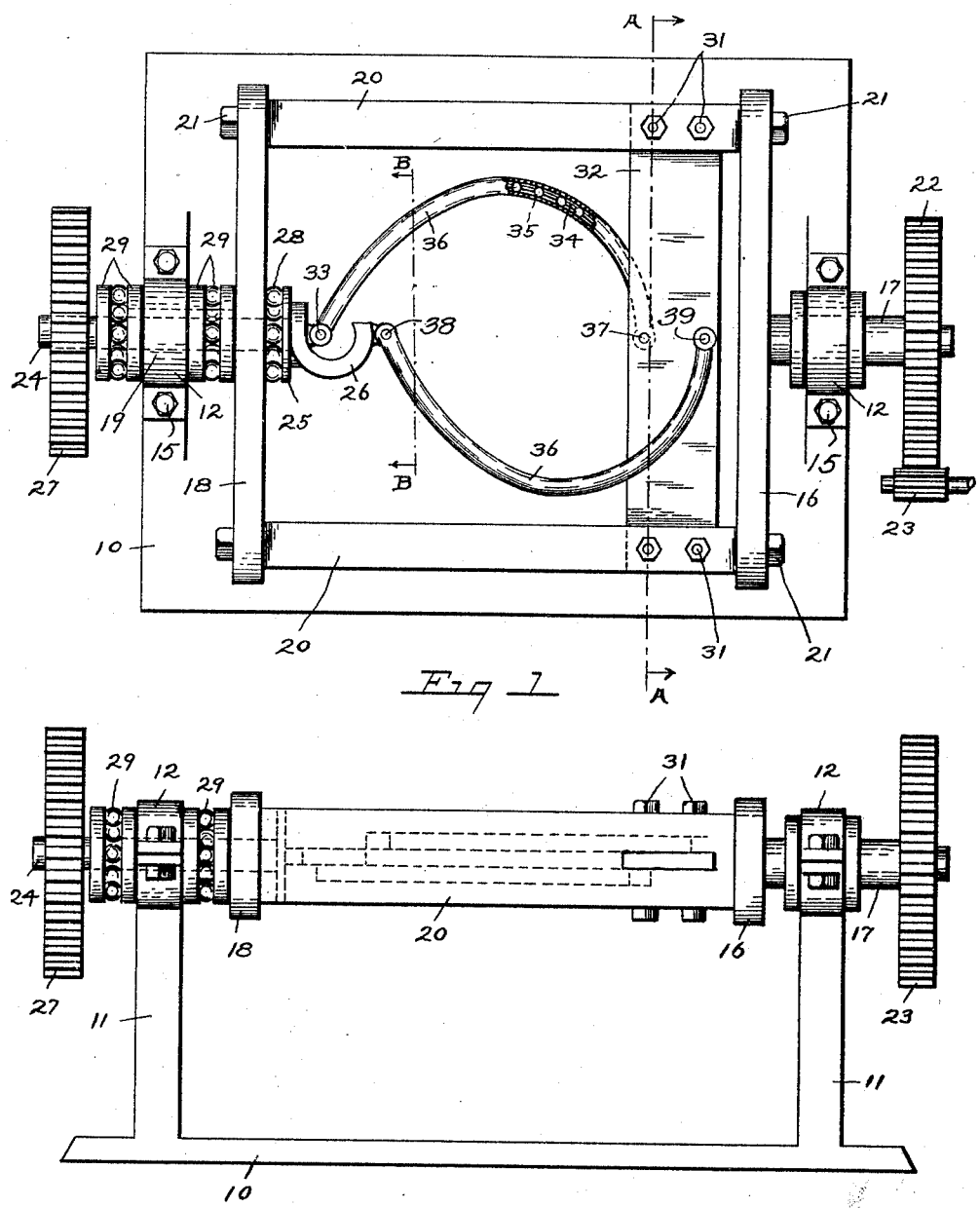
Figure 1 shows a top plan view of the device.
Figure 2 shows a side elevation of the same.

Referring to the drawings, the device is here shown as mounted on a standard or frame 10, but it is understood that the form of mounting will vary with the uses to which the device is put.

The frame 10, is formed with the two uprights 11, terminating at their upper ends in semicircular bearing halves, which together with semicircular cap members, fastened to the lower bearings halves by means of bolts 15, form bearings 12, which bearings contain either ball or roller elements.

The parts of the novel mechanical movement comprise a frame, here shown as rectangular, but which may be of any suitable shape, and which comprises the two ends 16 and 18; the end 16 being formed with a trunnion 17 which is rotatably mounted in one of the bearings 12; while the other end 18 is also formed with a trunnion 19, rotatably mounted in the other bearing 12; but this trunnion 19 is tubular in form, having a bore concentric with the bearings 12.

The two ends 16 and 18 of the frame are secured together by the two side rods 20, which have their ends shouldered to pass through holes in said ends 16 and 18, and are threaded for the securing nuts 21, or this frame may be made up in any suitable manner.

On the trunnion 17 and outside of the adjacent bearing 12, is secured a pulley or gear 22, which is driven in some suitable manner such as by a pinion and electric motor 23.

Within the tubular trunnion 19 is freely mounted with respect to rotation, a shaft 24, the inner end of which is formed with a collar 25 and a hooked shaped head 26; while to the other end of said shaft 24, and outside of the adjacent bearing 12 is secured by the key 30 a pulley or gear 27, designed to form a drive for any suitable purpose desired.

Located between the collar 25 and the end 18 is placed a thrust bearing 28; and on each side of the adjacent bearing 12 is also placed a thrust bearing 29.

Adjacent to the end 16 and secured by the bolts 31 to the sides 20 is a cross plate 32, which is located centrally so that the frame will be balanced, and can be freely rotated in either direction by the motor and gear 22.

To the hook-shaped head 26 at the point 33 is secured one end of a flexible shaft, comprising a series of links 34 and universal joints 35; and said flexible shaft is provided with a tubular casing 36, having its ends free; but the other end of said flexible shaft is secured to one side of the cross plate 32 at some suitable point as at 37; the shaft and casing assuming about the position shown in the drawing, although this curve will depend on the size and style of shaft employed and must be determined in each case.

A second similar flexible shaft, has one of its ends secured to the head 26 at the point 38 and its other end secured to the other side of the cross plate 32 as at 39, so that the balance of the frame will be maintained.

Now as the frame is rotated by the gear 22 and the motor, it will freely rotate in the bearings 12, and through or by one of the flexible shafts, the shaft 24 having a free rotary movement in the tubular trunnion 19 will rotate the gear 27 in the same direction; the other flexible shaft remaining slightly slack and when the direction of rotation is changed, this slack shaft will become tight and be the driver, and the other shaft will then become slack.

It has been found in practice that the two flexible shafts will assume the positions about as shown and will not drop or flop, and that each will counterbalance the other.

Having thus described my invention, what I claim as new and desire to secure by Letters Patent, is:

1. A mechanical movement, comprising in combination with a rotating member, a pair of flexible shafts having one of their ends rigidly secured to said member and adapted to travel therewith but have no individual axial rotation, one of said shafts acting as a driver through torsion during the clockwise rotation of the rotating member, and the other shaft acting as a driver through torsion during the counter-clockwise rotation of the rotating member.

2. In a device of the class described, comprising a frame adapted to be freely rotated on its axis, a pair of flexible shafts mounted within said frame in curved relation with each other and with the axis of said frame, one of the adjacent ends of each of said flexible shafts secured to said frame near one end thereof, a shaft mounted in axial relation to said frame and secured to the other ends of said flexible shafts and adapted to be driven thereby.

3. In a device of the class described, comprising a frame, alined trunnions secured to the opposite ends thereof and mounted in bearings in a freely rotatable manner, one of said trunnions formed with an axial bore, a shaft mounted therein, a pair of flexible shafts mounted within said frame with their body portions curved outward from each other, and with one of their ends rigidly secured to one end of said shaft and their other ends secured in a rigid manner to said frame near the opposite end thereof, means for rotating said frame, thereby driving said shaft through said flexible shafts by the torsion thereof.

In testimony whereof I affix my signature.

EMILE BACHELET.